W. P. KIDDER.
SHOCK ABSORBER.
APPLICATION FILED SEPT. 13, 1907.
905,438.
Patented Dec. 1, 1908.
2 SHEETS—SHEET 2.
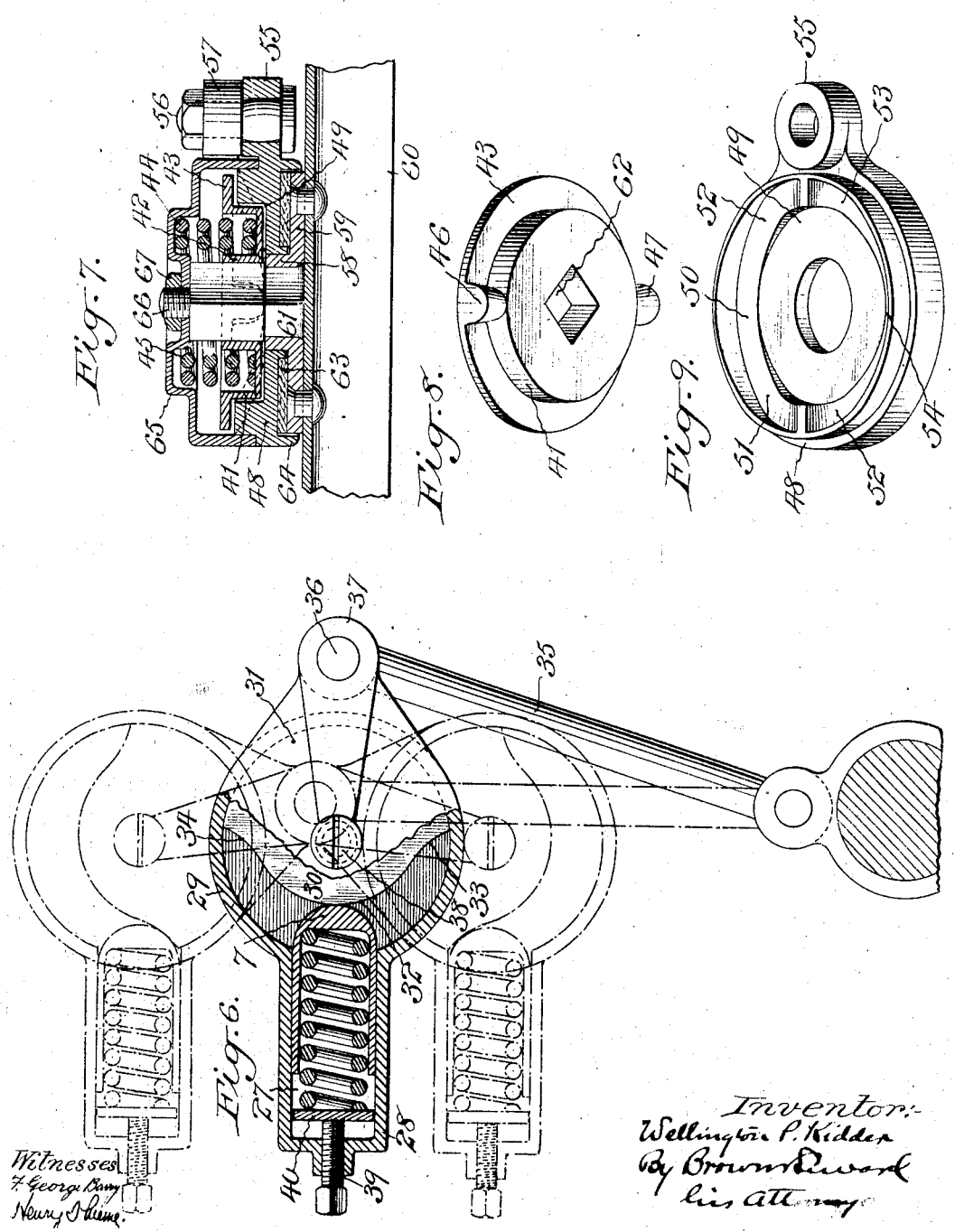

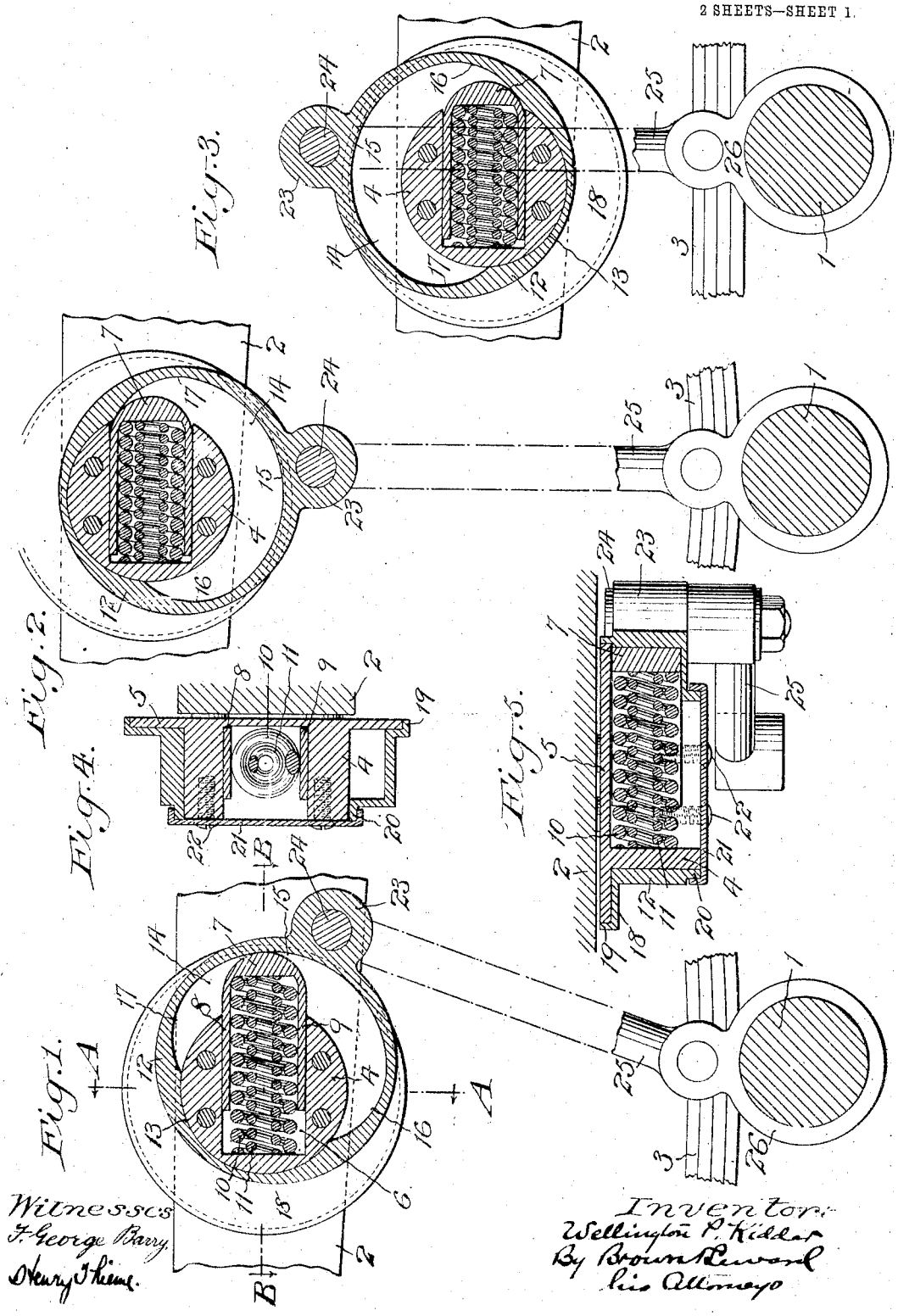

UNITED STATES PATENT OFFICE.

WELLINGTON P. KIDDER, OF JAMAICA PLAIN, MASSACHUSETTS.

SHOCK-ABSORBER.

No. 905,432.

Specification of Letters Patent.

Patented Dec. 1, 1908.

Application filed September 13, 1907. Serial No. 392,648.

*To all whom it may concern:*

Be it known that I, WELLINGTON P. KIDDER, a citizen of the United States, and resident of Jamaica Plain, in the county of Suffolk and State of Massachusetts, have invented a new and useful Shock-Absorber, of which the following is a specification.

My invention relates to a shock absorber, with the object in view of providing progressive resistance to the expansion and contraction of a vehicle spring when the latter is expanded or contracted beyond its normal reciprocatory movement and, at the same time, leaving the said spring free to vibrate or reciprocate within its normal limits with substantially its full natural resiliency.

With these ends in view, my invention consists broadly in bringing a spring pressed reciprocating member and a cam into engagement as the vehicle spring expands or contracts beyond its normal limit and thereby progressively and effectively arresting the expansion or contraction of the spring without jolt or shock.

My invention further consists in certain features of construction and combination of parts as will be hereinafter described and pointed out in the claims.

A practical embodiment of my invention is represented in the accompanying drawings, in which—

Figure 1 is a view of the shock absorber in side elevation, partly in section, as it appears in use attached to the axle and frame of a spring vehicle, the parts being shown in the position which they assume when the vehicle is at rest, Fig. 2 is a similar view showing the parts in the position which they assume when the vehicle spring has reached the full limit of abnormal expansion, Fig. 3 is a similar view showing the position which the parts assume when the vehicle spring has reached the limit of its abnormal compression, Fig. 4 is a section in the plane of the line A—A of Fig. 1, Fig. 5 is a section in the plane of the line B—B of Fig. 1, Fig. 6 is a view in side elevation, partly in section, of a modified form of the absorber showing in full lines the position which the absorber assumes when the vehicle is at rest and in dotted lines the position which it assumes when the vehicle spring has reached its limit of abnormal expansion and compression, Fig. 7 is a view in horizontal section of another modification, Fig. 8 is a view in detail in perspective of the reciprocating spring pressed member of the modified form shown in Fig. 7, and Fig. 9 is a view in detail in perspective of the cam member of said modified form.

Referring to Figs. 1 to 5 inclusive, the axle of the vehicle is denoted by 1, its body frame by 2 and the vehicle spring supporting the body from the axle, by 3. These several parts may be of any well known or approved construction, their introduction in the present case being simply for the purpose of showing a practical application of the shock absorber which forms the subject matter of the present invention.

The shock absorber comprises a cylindrical hub 4 projecting laterally from a base plate 5, the latter being provided with suitable means for securing it firmly to the side of the frame 2 of the vehicle. The cylindrical hub 4 is provided with a socket or recess 6 projecting into it centrally from its periphery at one side and terminating a short distance from the periphery at the opposite side. This socket or recess 6 is intended to receive with a free sliding fit, the stem of a plunger 7, the head of which is preferably rounded on its outer face for engagement with the cam, as will hereinafter appear.

The stem of the plunger 7 is preferably of skeleton formation, consisting of two legs 8 and 9, separate from each other, except where they join the head.

A spring 10 of sufficient stiffness to arrest the retarding effect, either alone or when supplemented by a second spring 11 as here shown contained within the bounds of the spring 10, is inserted between the bottom of the recess or socket 6 and the inner face of the head of the plunger 7 and between the legs 8 and 9, the tension of said spring or springs being so regulated as to hold the plunger 7 normally projected outwardly from the recess or socket 6 as clearly shown in Fig. 1.

The cam member is denoted by 12 and is here shown of cylindrical form with a bore 13 of suitable size to receive the hub 4 with an easy rotary fit. The bore 13 in the cam member 12 which receives the hub 4 is provided with a recess 14 extending radially away from the inner face of the bore, the bottom of said recess 14 being made throughout its central portion, as at 15, on a true circular or cylindrical curve, this curve gradually changing into sharper or parabolic curves 16 and 17 as it extends toward the opposite ends of the recess.

The cam member 12 is provided with a flange 18 which follows the outer face of the base plate 5 exterior to the hub 4 and this flange 18 is provided with an angular lip 19 which projects over the edge of the base plate 5. The said member 12 is further provided on its opposite end with annular rim 20 for the reception of a dust cap 21 which may be conveniently formed of pressed steel or other suitable metal and may be secured in position to protect the springs 10 and 11 and the plunger 7 by screws 22, in the present instance four screws passed through the said cap and tapped into the end of the hub 4.

The cam member 12 is provided with an extended lug 23 in which a pintle 24 may be seated for the reception of the upper end of a link 25 for connecting the rocking or rotary cam member 12 with a clip 26 fixed on the axle 1.

In operation, it is intended that the rounded outer end of the plunger 7 shall rest in proximity to but not bear with any considerable force against the bottom of the recess 14 intermediate of the points where the said bottom of the recess changes its form of curve from that of true cylindrical to that of a steeper or parabolical nature. This will afford no considerable resistance to the action of the vehicle spring within ordinary or normal limits of expansion and contraction as there will be no pressure exerted by the cam surface forming the bottom of the recess 14 at the opposite ends of its true cylindrical portion until the vehicle spring has expanded or compressed beyond its normal limits. When, however, the vehicle spring is, because of the vehicle striking an unevenness or obstruction in the road, thrown beyond its abnormal reciprocatory movement, the plunger will ride up these parabolical inclines at one or the other end of the recess, gradually at first, the steepness of the incline progressing until the pressure of the spring, either alone or in combination with other retarding features, arrests its further expansion or compression and permits it to return to normal.

It will be noted that not only does the spring actuated plunger 7 exert additional friction as it is gradually compressed more and more by the cam surfaces at the opposite ends of the recess 14 but as the cam member 12 is rotated or rocked on the hub 4, the advantage of leverage which is about maximum when the vehicle is at rest will gradually lessen until the link is thrown nearly but not quite on center, the construction being such that the link cannot pass beyond to a position on center. It will be further observed that not only is the leverage shortened and the spring thereby favored by the rocking of the cam member but the pressure of the bottom of the recess 14, i. e., of the cam surface on the end of the plunger, is directed gradually more and more toward a line transverse to the reciprocating movement of the plunger thereby not only having less effect to force the plunger against the tension of its spring but actually setting up frictional resistance between the outer surface of the leg of the plunger and the wall of the recess 6 in which the plunger reciprocates.

It is not intended that the shock absorber shall ever reach the positions shown in Figs. 2 and 3, these positions being the limits beyond which it cannot be forced, the intention being that the spring or springs 10 and 11 shall have sufficient stiffness when coacting with the shortening of leverage and the steepness of the parabolical cams to arrest the movements of the vehicle spring before the shock absorber ever reaches these extreme limits. In the modified form shown in Fig. 6, the spring pressed plunger 7 is seated in a socket 27 formed in an extension 28 of a casing 29 in which the cam member 30 rocks. In this form, the cam member 30 has a cylindrical disk cover 31, formed integral therewith, or secured thereto, and the cam has a convex cylindrical cam portion 32 which terminates in eccentric or parabolical curves 33, 34, at the opposite ends of the cylindrical curve 32 and the said member is rocked by means of a link 35 connected with the part 31 and hence with the cam member by means of a pintle 36 extending through a projecting lug 37.

The casing 29 is intended to be fixed firmly to the frame of the vehicle while the cam member 30 rocks on a pivot pin 38.

The tension on the spring which actuates the plunger 7 is regulated in this instance by means of a screw 39 which extends through the end of the casing extension 28 and engages a follower 40 at the base of the spring.

The operation of the parts as shown and described in this modification, Fig. 6, is quite similar to that already described, the rotation of the cam member within the casing as the spring normally expands and contracts having no effect upon the plunger 7, the tension of its spring being such as to hold it in proximity to the cylindrically curved portion of the cam member without any considerable pressure against it but whenever the vehicle spring expands or contracts to an abnormal extent, the eccentric or parabolical portions of the cam member will engage and force the plunger 7 inwardly thereby producing a retarding effect upon the rocking of the cam member, which effect will be multiplied by the shortening of the lever, the gradual steepening of the cam surface and the change in direction in which the cam surface applies pressure to the plunger.

In the modification shown in Figs. 7, 8 and 9, the spring pressed reciprocating plunger is denoted by 41 and consists of a cylindrical dished piece provided with a central hub 42 and an annular flange 43. Around the hub 42 the springs 44, 45, are placed, resting against the inner face of the head of the dish-shaped member. This member is further provided with a pair of rounded nosed lugs 46, 47, on the under side of its flange 43 as clearly shown in Fig. 8, and these lugs are intended to ride on cams formed on the cam member 48. This cam member 48 is provided with a cylindrical recess 49 for the reception of the dished portion of the spring pressed plunger or member 41 and around the exterior of this recess 49 there is formed on the outer face of the member 48, two pairs of inclines, one for each of the lugs 46, 47.

The members of each pair of inclines are connected by a plane portion 50 which is substantially parallel with the plane of rotation of the member 48, the surfaces 51 and 52 on the opposite sides of this plane surface 50 being arranged to gradually increase in steepness preferably in a parabolical curve to their limits which, in the present instance, are of a height corresponding to the extreme depth of the recess 49.

The pair of cam surfaces above described are intended to engage the lug 47 and similar surfaces 52, 53, connected by a plane portion 54, are provided for engaging the lug 46.

The member 48 is provided with a lug extension 55 through which a pintle 56 passes to connect a link 57. The rocking or rotary cam member 48 is mounted on a hub 58 projecting from a base plate 59 which may be riveted or otherwise fixedly secured to the vehicle frame 60.

In the hub 58 there is fixed a stud 61 which projects through and is made to conform in cross section to a squared opening 62 in the center of the spring pressed member 41 to hold the latter against a rotary movement while permitting it to slide on the stud as it is forced outwardly and inwardly by the cams on the member 48.

The member 48 may have interposed between it and the base plate 59 a washer 63 of leather or other suitable material and the periphery of said member 48 may have a downwardly extending annular flange 64 for overlapping the joint between the washer 63 and the base plate 59 to prevent dust and dirt from getting in between the parts and grinding.

A cap 65 is fixed by means of a screw 66 and nut 67 at the end of the stud 61 in position to house the springs 44, 45, and the reciprocating spring pressed member 41, the said cap overlapping the upper edge of the rocking cam member 48.

In all the forms described, the recesses or chambers in which the operating parts are located may be filled with a suitable lubricant to cause them to work freely and without undue wear and the said operative parts are completely housed against the introduction of dust and dirt a feature of great importance in connection with vehicles which are intended to travel under all conditions of weather and roads.

The surfaces referred to in the foregoing description as plane surfaces intermediate of the cam surfaces and denoted by the numerals 15, 32, 50 and 54, are in effect neutral surfaces in that they have no effect upon the spring pressed reciprocating member or plunger 7 to force it back against the tension of this spring and it is this neutral surface in each instance which permits the expansion and compression of the vehicle spring within normal limits without hindrance.

It will be observed that the principal load, in protecting the vehicle springs, is sustained primarily by the links. These links may swing to positions nearly on centers and during such swinging movement they are retarded by the graduated or progressive control of the spring pressed member by the cam, the downward and upward movement of the vehicle body being thereby gradually arrested with the smoothness, approximately, of a reciprocating body actuated from a steadily rotating crank.

It is evident that changes might be resorted to in the form and arrangement of the several parts without departing from the spirit and scope of my invention; hence I do not wish to limit myself strictly to the structure herein shown and described, but

What I claim is:—

1. A shock absorber comprising a spring-pressed, reciprocating member and a cam member, the said members being mounted in rotative relation one to another with the cam of the cam member in position to operate the spring-pressed, reciprocating member, the said spring pressed reciprocating member being arranged to reciprocate in a plane substantially parallel to the plane of rotation of the rotative member.

2. A shock absorber comprising a spring-pressed, reciprocating member and a cam member, the said members being mounted in rotative relation, one to another, with the cam of the cam member in direct engagement with the spring-pressed, reciprocating member, the said spring pressed reciprocating member being arranged to reciprocate in a plane substantially parallel to the plane of rotation of the rotative member.

3. A shock absorber comprising a spring-pressed, reciprocating member and a cam member, the said members being mounted in rotative relation one to another and the cam member being provided with cams having a progressive increase in pitch and separated by a neutral surface along which the spring-pressed, reciprocating member is arranged to travel.

4. A shock absorber comprising a spring-pressed, reciprocating member and a cam member, the said members being mounted in rotative relation one to another and the cam member being provided with cam surfaces having a progressive increase in pitch and arranged to act on the spring-pressed reciprocating member.

5. A shock absorber comprising a spring-pressed, reciprocating member and a rotative cam member arranged to act upon the spring-pressed, reciprocating member, the said spring pressed reciprocating member being arranged to reciprocate in a plane substantially parallel to the plane of rotation of the cam member.

6. A shock absorber comprising a spring-pressed, reciprocating member and a rotative cam member, the cam on the cam member being so disposed as to act on the said spring-pressed member in directions at different angles to the axis of the spring-pressed member.

7. A shock absorber comprising a spring-pressed, reciprocating member, a support within which said member is mounted and a rotative cam member mounted in proximity to said support with its cam in position to engage the spring-pressed member, the said spring pressed reciprocating member being arranged to reciprocate in a plane substantially parallel to the plane of rotation of the cam member.

8. A shock absorber comprising a spring-pressed, reciprocating member, a support within which the said member is mounted and a rotative cam member mounted in proximity to said support and provided with cams spaced apart by a neutral surface and arranged to act upon the spring pressed member.

9. A shock absorber comprising a spring-pressed, reciprocating member, a support within which said member is mounted and a rotative cam member embracing the said spring-pressed member and provided with cams arranged to act upon the spring-pressed member.

10. A shock absorber comprising a spring-pressed, reciprocating member, a support within which said member is mounted and a rotative cam member mounted on the said support and embracing the said spring-pressed member, the cam member being provided with a cam, the operating surface of which has a progressively varying pitch and arranged to act upon the said spring-pressed member.

11. A shock absorber comprising a spring-pressed, reciprocating member, a support within which the said member is mounted, a rotative cam member mounted on said support and embracing the said spring-pressed member, the said cam member being provided with cams arranged to move the spring-pressed member in a direction radial with respect to the axis of the rotative member.

12. A shock absorber comprising a spring-pressed, reciprocating member, a support within which the said member is mounted and a rotative cam member mounted in proximity to said support and provided with cams arranged to move the spring-pressed member in a direction radial with respect to the axis of the rotative member.

13. A shock absorber comprising a spring-pressed, reciprocating member, a support within which said member is mounted, a rotative cam member embracing said spring-pressed member and a cover for inclosing the space within which the spring-pressed member reciprocates.

14. A shock absorber comprising a spring-pressed, reciprocating member, a support provided with a socket within which the said member reciprocates and from which the member projects and a rotative cam member embracing said spring-pressed member, and provided with a cam recess for receiving the projecting end of the said spring-pressed member.

15. In a shock absorber, the combination with a load sustaining link arranged to continuously change its leverage when in action, of means for applying a progressive resistance to the movement of said link at a varying rate of increase.

16. In a shock absorber, the combination with a load sustaining link arranged to continuously change its leverage when in action, of a spring pressed member and means interposed between the said link and spring pressed member for applying a progressive resistance to the movement of the link at a varying rate of increase.

17. In a shock absorber, the combination with a load sustaining link arranged to continuously change its leverage when in action, of a spring-pressed member and a cam interposed between the said link and spring-pressed member, the operating face of said cam having a curve of varying pitch whereby a progressive resistance with varying rate of increase is produced.

18. In a shock absorber, the combination with a load sustaining link arranged to continuously change its leverage when in action, of a reciprocating spring-pressed member and a cam interposed between the spring-pressed member and link and arranged to exert pressure on the spring-pressed member at different angles to the axis of said member as the crank moves.

In testimony, that I claim the foregoing as my invention, I have signed my name in presence of two witnesses, this 9th day of September.

WELLINGTON P. KIDDER.

Witnesses:
R. S. BARROWS,
ARTHUR P. BENNETT.